(No Model.) 2 Sheets—Sheet 1.
I. B. McCORMACK.
FEED WATER PURIFYING APPARATUS.
No. 357,328. Patented Feb. 8, 1887.
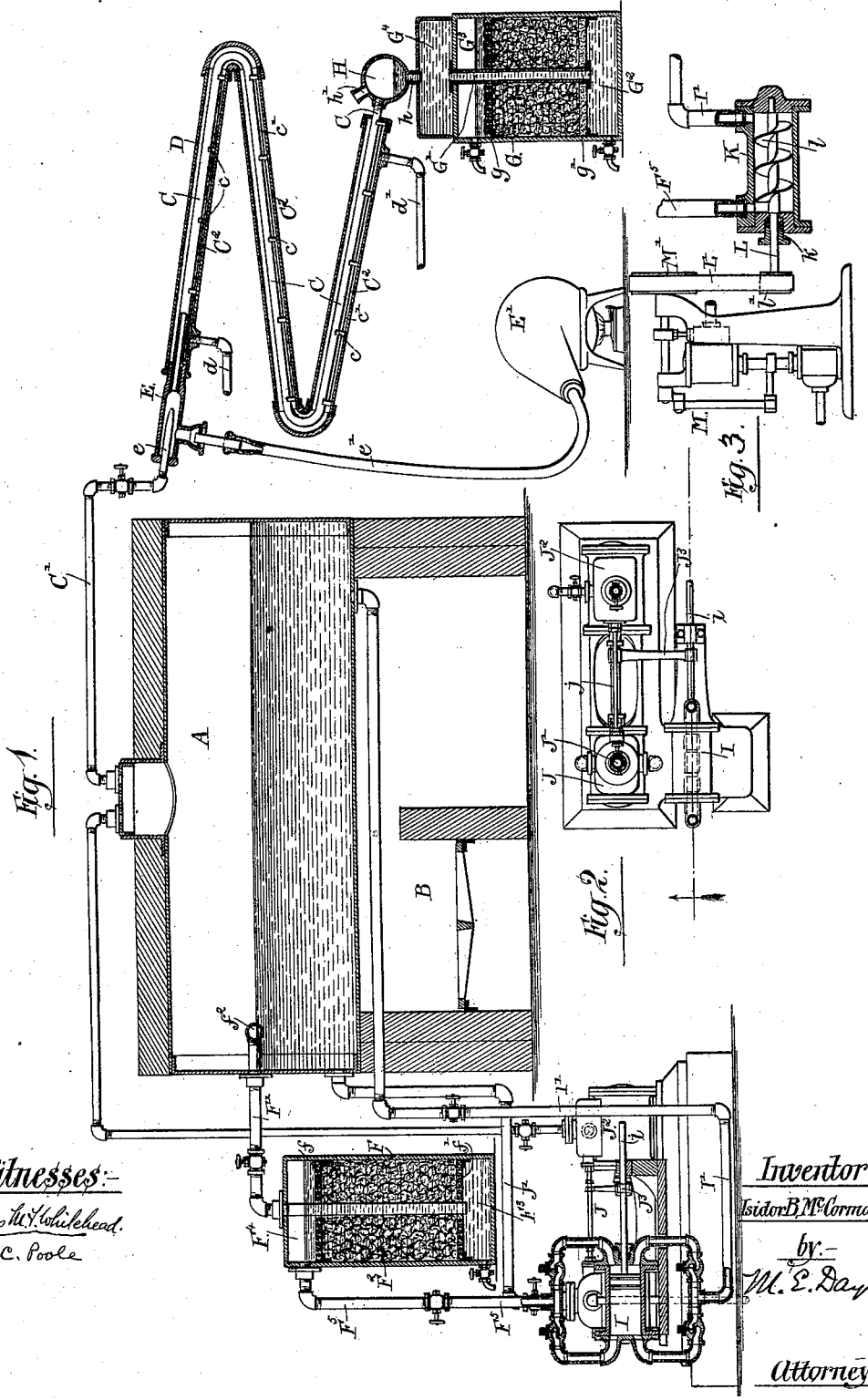
Witnesses:
Louis M. Whitehead.
C. C. Poole.
Inventor:
Isidor B. McCormack
by:
M. E. Dayton
Attorney (No Model.) 2 Sheets—Sheet 2.
I. B. McCORMACK.
FEED WATER PURIFYING APPARATUS.
No. 357,328. Patented Feb. 8, 1887.
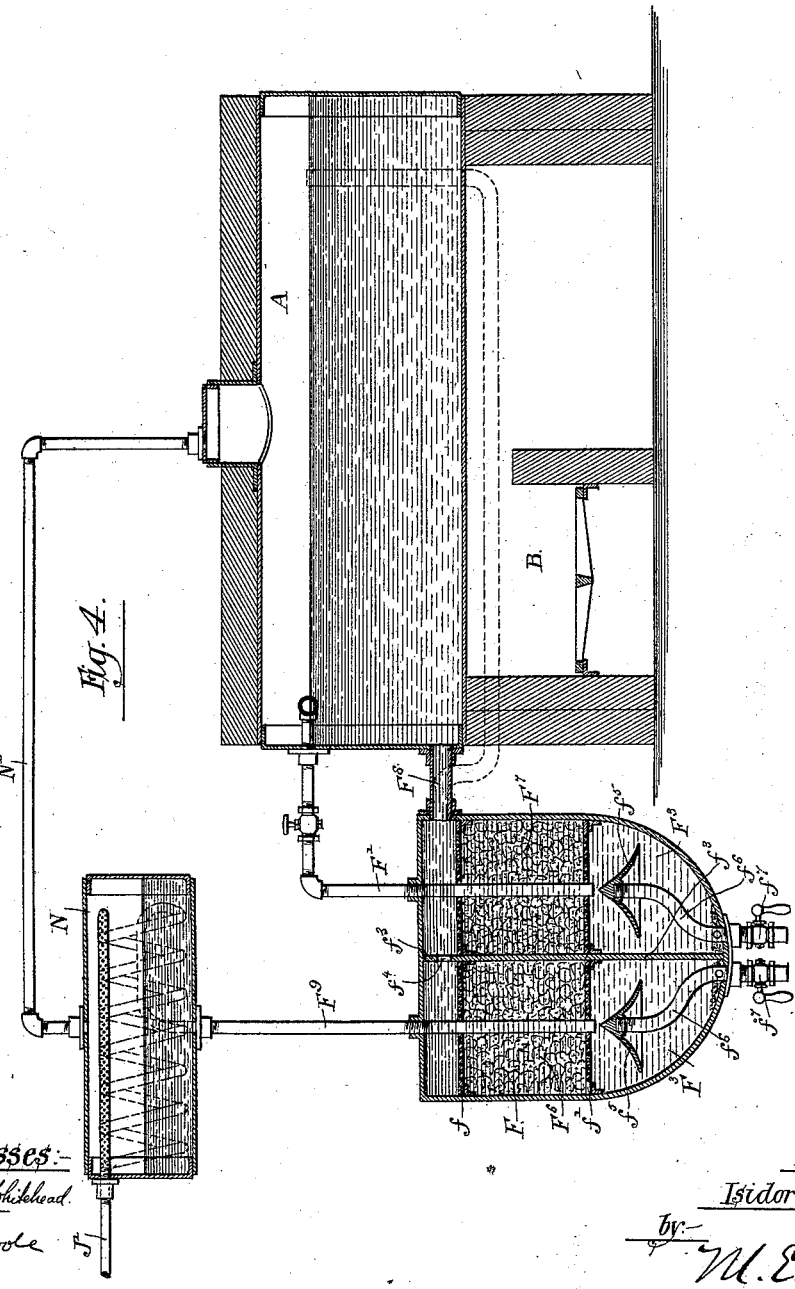

UNITED STATES PATENT OFFICE.

ISIDORE B. McCORMACK, OF CHICAGO, ILLINOIS.

FEED-WATER-PURIFYING APPARATUS.

SPECIFICATION forming part of Letters Patent No. 357,328, dated February 8, 1887.

Application filed January 25, 1886. Serial No. 189,575. (No model.)

*To all whom it may concern:*

Be it known that I, ISIDORE B. MCCORMACK, of the city of Chicago, in the county of Cook, in the State of Illinois, have invented certain new and useful Improvements in Feed-Water-Purifying Apparatus; and I do hereby declare that the following is a full, clear, and exact description of the same, reference being made to the accompanying drawings, and to the letters of reference marked thereon, which form part of this specification.

The object of this invention is to provide improvements in apparatus for distilling water for the purpose of purifying it, of that class illustrated, for instance, in a prior application for patent, Serial No. 172,959, filed by me in the United States Patent Office upon the 29th day of July, 1885.

The invention consists in the matters hereinafter described, and pointed out in the appended claims.

The device herein shown as embodying my invention embraces a boiler or steam-generator—such as may be used for distilling water in the manner illustrated in said prior patent, or which may be used to supply steam to an engine, or for other purposes—and a filter connected with the boiler for purifying the water within the latter, together with means for producing a circulation of water from the boiler through the filter, whereby the water within the boiler is continuously acted upon or purified during the operation of the device, as will hereinafter fully appear.

In the accompanying drawings, illustrating my invention, Figure 1 is a sectional elevation illustrating an apparatus embodying my invention. Fig. 2 is a plan view of the feed and circulating pump shown in Fig. 1. Fig. 3 is a view illustrating another form of a circulating-pump, which may be used in place of that shown in Figs. 1, 2. Fig. 4 is a detail sectional view showing a form of filtering device adapted for use in place of those shown at the left hand in Fig. 1.

As illustrated in the said drawings, A indicates the boiler or steam-generator, B a furnace located beneath the boiler, and F a filter, consisting of a cylindric vessel made steam-tight and connected with the boiler by means of suitable pipes, by means of which water from the boiler is carried through said filter.

In the construction of the filter F, illustrated in Fig. 1, said filter is made with two horizontal perforated partitions, $f\ f'$, between which the filtering material $F^2$ is placed, the inlet-pipe $F'$, which takes water from the boiler at the level of the water therein, being extended downwardly through the top of the filter and through the partitions $f\ f'$ to the lower compartment, $F^3$, formed between the partition $f'$ and the bottom of the filter. The pipe $F'$ is connected within the boiler with a horizontal perforated pipe or tube, $f^2$, arranged at the level of the top of the water, whereby solid particles and other matters accumulating in the form of scum at the top of the water may be drawn off, and will pass through the filter. At the top of the filter, above the perforated partition $f$, is formed a second chamber, $F^4$, with which the exit-passage $F^5$ of the filter communicates, the parts being so arranged that the water entering the lower chamber, $F^3$, through the pipe $F'$, will pass upwardly through the filtering material and be discharged through the pipe $F^5$.

As shown in said Fig. 1, I is a circulating-pump, which is connected by means of the pipe $F^5$ with the exit-aperture of the filter, and by a pipe, I', with the lower part of the boiler. J is a feed-pump, which communicates with the boiler by means of a pipe, J', and is actuated by the common form of steam-cylinder, $J^2$. (Shown in Figs. 1 and 2 as constructed to actuate also the circulating-pump I by means of a rigid arm, $J^3$, connecting the piston-rod $j$ of the said steam-cylinder with a piston-rod, $i$, of the said circulating-pump.) In the particular construction shown the said pipe $F^5$ is connected with the pump I by means of two valved passages, as shown, and the pipe I', leading from the said pump I to the boiler, is similarly connected with the pump-cylinder; but these parts may be otherwise arranged, as found convenient or desirable.

From the construction above set forth it is entirely obvious that during the operation of the feed-pump and the pump I water will be constantly supplied to the boiler, while at the same time constant circulation of the water of the boiler through the filter F will take place.

Another form of circulating device applicable in cases where a feed-pump having a rotating shaft, or where other motive power may be obtained in position convenient for giving rotary motion, is illustrated in Fig. 3. In this case the pipes F⁵ I' are shown as connected with the opposite ends of a cylinder, K, within which is placed a revolving shaft, L, provided with a spiral wing or flange, l, arranged to fit closely within the cylinder, so that when the shaft is revolved the water will be carried from one end to the other of the cylinder, and thereby caused to circulate through the said pipes. The shaft L is, as shown, arranged to pass through a suitable gland, k, in one end of the cylinder K, and is provided with a belt-pulley, l', over which is trained a belt, L', passing over a pulley, M', belonging to the steam-feed-pump. (Indicated as a whole by M.) This construction, in common with that shown in Figs. 1 and 2, presents the advantage of requiring only a single steam-cylinder for the actuation of both a feed and circulating pump.

The construction in means for purifying the water within the boiler, which is in some respects preferable to that shown in Fig. 1, is illustrated in Fig. 4. In this case the filter F is made double, or in two parts or chambers, F⁶ F⁷, divided centrally by a vertical partition, f³, and the water from the boiler is carried by means of connecting-pipes F' and F⁸ from the boiler through one, F⁷, of the filtering-chambers and back into the boiler, and the feed-water, instead of being introduced directly into the boiler, is first heated to cause the separation therefrom of sedimentary matter, and then passed through the other filtering chamber, F⁶, by means of a vertical inlet-pipe, F⁹, and then allowed to mingle with the water from the boiler and to pass into the boiler with the latter, the feed-water being conveniently allowed to flow from the filtering-chamber F⁶ to the chamber F⁷ by means of an orifice, f⁴, in the partition f³ between the said chambers, above the perforated partition f thereof.

One way of heating the feed-water when this construction is used is shown in full lines in said Fig. 4, in which a closed chamber or vessel, N, is located above the filter, and preferably at a point considerably above the level of the water in the boiler, said chamber being connected with the steam-space of the boiler by a steam-pipe, N', and with the upper end of the pipe F⁹, by means of which the feed-water is carried into the chamber F⁶ of the filter. The feed-water pipe J' in this case, instead of communicating directly with the boiler, extends into the upper part of the chamber K, and is perforated in its portion within the said chamber, so as to allow the escape therefrom of the feed-water in a number of fine jets or streams. In the operation of the parts thus constructed the feed-water in passing from the feed-pipe J' into the chamber N is heated by the steam contained therein, and, accumulating in the lower part of the vessel, is caused to descend by gravity, or by the head due to the difference in level between water in the vessel and in the boiler, through the pipe F⁹ to the filtering-chamber F⁶, and thence to the boiler with the water from the other chamber, F⁷.

Inasmuch as the steam under the boiler-pressure within the chamber N is calculated to heat the feed-water approximately to, if not above, the boiling-point, the solid matters contained in the feed-water will thereby be caused to accumulate in particles in a familiar manner, which particles will be arrested by the filtering material, so that the feed-water will be rendered practically free from matter liable to accumulate in the boiler in the form of sediment or incrustation.

The employment of the particular means above described for heating feed-water is not, however, essential to the operation of the other parts of the apparatus, and the said feed-water may be heated by other means before it is carried into the filter—as, for instance, by the familiar device of a coil within a steam-drum, as illustrated, for instance, in dotted lines in Fig. 4, in which the feed-pipe J' is shown as continued in the form of a coil through the chamber N, and thence extended to connect directly with the pipe F⁹.

In the construction first described, in which the feed-water is delivered from the feed-pipe into the chamber N, circulation of the said feed-water through the filter will be caused by the pressure due to the head of water in said chamber and in the pipe F⁹; but where the feed-water is heated by a coil, as shown in dotted lines in Fig. 4, circulation through the filter will be caused directly by the pressure of the feed-water, and in this case the steam-drum and the coil need not be elevated, as is the case with the chamber N herein illustrated.

Circulation of the water from the boiler through the pipes F' and F⁸ and the intermediate filter may take place by reason of the greater heat applied to the water within the boiler, causing an upward current therein and corresponding downward movement in the pipe F' in a familiar manner; or the pipe F⁸ may be extended through the furnace beneath the boiler, as indicated in dotted lines in said Fig. 4; or a circulating-pump similar to that shown in Fig. 1 or Fig. 3 may be interposed in said pipe F⁸, to cause the desired circulatory movement of the water. In either case said pipe F⁸ will be made of sufficient size to carry both the water taken from the boiler by the pipe F' and that entering the filter through the feed-pipe J'.

The filter illustrated in Fig. 4 differs from that shown in Fig. 1 in being provided within the lower chamber, F³, thereof with cones or deflectors f⁵, located with their apices uppermost, and beneath the exits of the pipes F' and F⁹, whereby the water passing out of said pipes into the said chamber will be deflected laterally in all directions before passing upwardly through the filtering material, and a space will be formed beneath the said cone containing dead or motionless water. The object of this construction is to afford a space in which solid particles or sedimentary matter in the water may be deposited, it being entirely obvious that any of such particles or matter which may settle from the water in the chamber will fall through the space between the said cone and the side walls of the chamber, and thereby enter the space beneath the cone, where it will remain undisturbed until removed in cleaning the filter. By this device a considerable portion of the solid particles may be removed from the water before the latter passes through the filtering material, with the obvious advantage of causing a slower deposition of solid matter in the said filtering material, and a consequent increase in the efficiency of the filter, and in the length of time in which it may be used without the renewal of the filtering material.

The cones $f^5$ may be supported in any suitable manner within the chamber $F^3$, the construction herein shown for this purpose consisting of pieces of pipe or tubing $f^6$, secured in the walls of the chamber at the lowest points thereof, said pipes or tubes being conveniently extended through the said walls and perforated within the chamber, and provided with cocks or valves $f^7$ outside of the chamber, as shown, whereby a convenient means of drawing off the water and sediment from the chamber is provided.

It is to be observed, in connection with the form of the filter shown in Fig. 3, that the partition $f^3$, extending to the top of the case of the filter, may sometimes be dispensed with, in which case the feed-water will become intermingled with the water from the boiler in the lower instead of the upper chamber of said filter.

I claim as my invention—

1. The combination, with a boiler, of a filter provided with inlet and outlet passages communicating with the interior of the boiler, a circulating-pump suitably connected for producing a circulation of water from the boiler through the filter, a feed-pump for the boiler, and a single motor actuating both the circulating-pump and the feed-pump, substantially as described.

2. The combination, with a boiler, of a filter, an inlet pipe or passage leading from the boiler to the filter, an outlet pipe or passage leading from the filter into the boiler, a feed-pump, a pipe connecting the said feed-pump with the filter, and means for heating the feed-water preparatory to its entrance into the filter, whereby said filter operates to purify the feed-water before its introduction into the boiler, and also to separate impurities from the water within the boiler, substantially as described.

3. The combination, with a boiler, of a filter, an inlet-pipe to the filter leading from the boiler, an outlet-pipe to said filter leading into the boiler, a pump for producing a circulation through the boiler and filter, comprising a cylinder or casing and an interior revolving shaft provided with a spiral propeller-blade, a feed-pump, a pipe connecting said feed-pump with the filter, and means for heating the feed-water preparatory to its entrance into the filter, substantially as described.

4. The combination, with a boiler, of a filter provided with an outlet-pipe communicating with the interior of the boiler, a feed-pump, a closed chamber or vessel located above the level of the water in the boiler, a pipe leading from the feed-pump into the said vessel and provided with perforations in its portion within the latter, a pipe leading from the lower part of the said vessel or chamber to the said filter, and a steam-pipe leading from the boiler to the upper part of said chamber, whereby the feed-water escaping from the perforations in the feed-pipe is heated by the steam within the chamber, substantially as described.

5. The combination, with a boiler, of a filter divided by a vertical partition into two parts or chambers, an inlet-pipe leading from the boiler and extending vertically into the filter, an outlet-pipe connecting the filter with the boiler, a feed-pump, a pipe connecting the feed-pump with the filter, and means for heating the feed-water before its entrance into the filter, the said partition being provided with an opening or passage affording communication between the parts or chambers of the filter, substantially as described.

6. The combination, with a boiler, of a filter divided by a vertical partition into two parts or chambers, an inlet-pipe leading from the boiler and extending vertically into the filter, an outlet-pipe connecting the filter with the boiler, a feed-pump, a pipe connecting the feed-pump with the filter, means for heating the feed-water, an opening or passage affording communication between the said parts or chambers of the filter, and conical deflectors located in a chamber of the filter beneath the openings of the said inlet-pipes from the boiler and feed-pump, substantially as described.

In testimony that I claim the foregoing as my invention I affix my signature in presence of two witnesses.

ISIDORE B. McCORMACK.

Witnesses:
C. CLARENCE POOLE,
M. E. DAYTON.